United States Patent [19]

Koch

[11] Patent Number: 5,533,702
[45] Date of Patent: Jul. 9, 1996

[54] COMBINATION COMPUTER AND REMOVABLE PAPER HOLDER

[75] Inventor: Richard C. Koch, RSM, Calif.

[73] Assignee: Alpha Enterprises, Inc., North Canton, Ohio

[21] Appl. No.: 241,616

[22] Filed: May 12, 1994

[51] Int. Cl.⁶ .................................................. B41J 11/02
[52] U.S. Cl. ........................ 248/442.2; 248/450; 248/451; 248/918; 24/67.11
[58] Field of Search ........................... 248/442.2, 441.1, 248/447, 450, 451, 454, 457, 458, 462, 918, 460; 24/67.11, 563; D19/88, 90

[56] References Cited

U.S. PATENT DOCUMENTS

| D. 301,044 | 5/1989 | Judd | D19/88 |
|---|---|---|---|
| D. 316,275 | 4/1991 | Davis et al. | D19/91 |
| D. 327,502 | 6/1992 | Maloney | D19/88 |
| 3,161,398 | 12/1964 | Fisher | 248/451 |
| 3,362,666 | 1/1968 | O'Donnell | 248/633 |
| 3,779,504 | 12/1973 | Schwartz et al. | 248/441 |
| 4,619,429 | 10/1986 | Mazza | 248/447.2 |
| 4,790,680 | 12/1988 | Givati et al. | 24/67.9 X |
| 4,902,078 | 2/1990 | Judd | 312/7.2 |
| 4,914,791 | 4/1990 | Lorber | 24/67.9 |
| 4,943,024 | 6/1990 | Meyer | 248/316.7 |
| 4,960,257 | 10/1990 | Waters | 248/442.2 |
| 5,010,629 | 4/1991 | Hirzel | 24/67.9 |
| 5,078,358 | 1/1992 | Egly et al. | 248/447.1 |
| 5,082,235 | 1/1992 | Crowther et al. | 248/918 |
| 5,093,760 | 3/1992 | Bedol | 24/67.9 X |
| 5,292,099 | 3/1994 | Isham et al. | 248/442.2 |
| 5,398,384 | 3/1995 | Rinard | 24/67.9 |

FOREIGN PATENT DOCUMENTS

| 960233 | 10/1949 | France | 24/67.9 |
|---|---|---|---|
| 2433528 | 1/1976 | Germany | 248/442.2 |

*Primary Examiner*—Alvin C. Chin-Shue
*Assistant Examiner*—Brian J. Hamilla
*Attorney, Agent, or Firm*—Sand & Sebolt

[57] ABSTRACT

In combination, a computer and removable paper holder. The paper holder is adapted to be removably mounted on a computer, preferably on a portable or notebook computer display screen, for securing a sheet of paper adjacent thereto. The holder is made of flexible plastic and includes a body having a pair of end edges and a pair of side edges. A pair of spaced legs extend outwardly from one side edge of the body adjacent the end edges. A central flange extends outwardly from the body and is centrally positioned intermediate the legs. The body is in a planar configuration for ease of storage and transporting but is flexed into a bowed arcuate configuration when mounted on a portable computer display screen. When flexed into this arcuate configuration, the screen edge is interposed between the central flange and the respective legs. A resilient clip is formed integrally with the body and located centrally thereon to hold a paper sheet against the body. A pair of paper alignment tabs are also formed on the body and are positioned adjacent each leg to align and support an edge of the paper with respect to the computer screen.

6 Claims, 4 Drawing Sheets

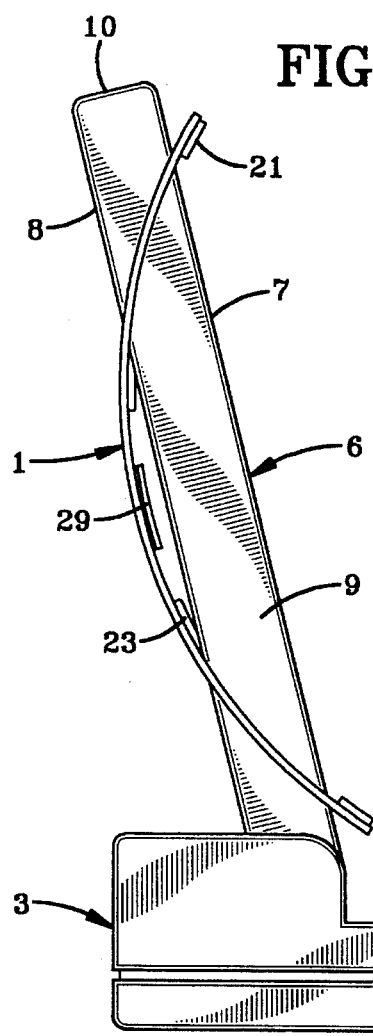
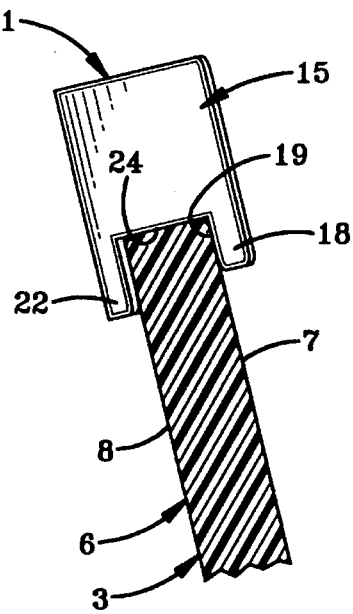
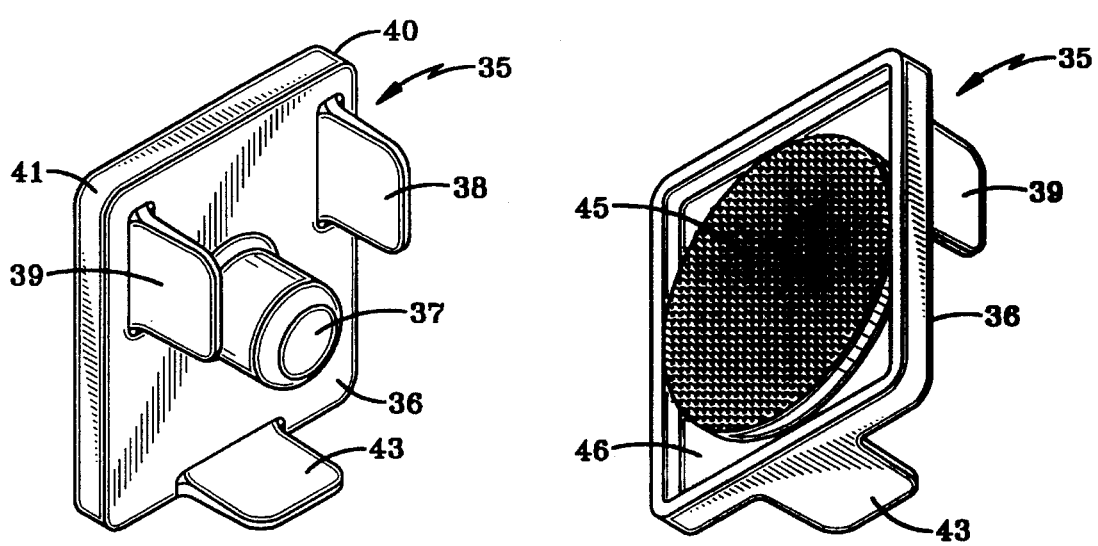
FIG-5
FIG-6
FIG-7
FIG-8

5,533,702

COMBINATION COMPUTER AND REMOVABLE PAPER HOLDER

BACKGROUND OF THE INVENTION

1. Technical Field

The invention relates generally to an improved paper holder. More particularly, the invention relates to a paper holder for supporting a document or sheet of paper for reading. Specifically, the invention relates to an improved portable paper holder for supporting a document adjacent a computer screen for reference by a computer user.

2. Background Information

Since the advent of the personal computer, manufacturers and industrial users have continually developed faster, smaller and more versatile machines, including portable computers that may be dedicated to perform a specific function such as word processing, or may be all purpose computing machines capable of running a variety of types of software programs. These portable personal computers may interact with a variety of portable and stationary input/output devices such as printers, light pens, etc. Moreover, these computers usually provide an electric cord for receiving power from a standard electrical outlet, as well as a battery pack for powering the unit when an electrical outlet is unavailable or is inconvenient. The portability and versatility of portable computers, in combination with the ever decreasing size and weight of these machines, has attracted a significant number of users, with the number of users expected to dramatically increase in the near term.

One benefit of portable computers that has attracted a significant number of users is that they may be used in any manufacturing, professional or personal setting where little if any desk space is available, or where the computer must be supported on the user's legs, for example in an automobile or airplane. Thus, the portable computer permits the user to be productive during heretofore nonproductive travel time.

However, one problem associated with portable computers, and the environment in which they are generally operated, is the inability to support documents adjacent the computer screen, either for informational reference while working on the computer, for example reference materials required when developing spreadsheets; or simply for viewing while the document itself is keyed into the computer. This problem is especially pronounced when the portable computer is used on an airplane or in an automobile where there are no flat surfaces available, and where space is extremely limited.

While a number of prior art paper holding devices have been developed, and are presumably adequate for the purposes for which they are intended, these prior art devices are generally at least the size of an 8½×11 sheet of paper, and independently support the paper to be viewed by the computer user. As such, the prior art devices are not conveniently carried from location to location, and are generally only utilized on a desk, table or similar flat surface.

Therefore, the need exists for a paper holder which is portable, lightweight and which is supported on the computer without the need for a large work surface. The need also exists for a paper holder which may be easily attached and detached to the computer, and which will securely retain a sheet of paper adjacent the computer screen.

SUMMARY OF THE INVENTION

Objectives of the invention include providing an improved paper holder for securing a sheet of paper adjacent a computer screen.

A further objective includes providing such a paper holder which is portable and lightweight.

Yet another objective of the invention is to provide such a paper holder which is supported by the computer to reduce the work area necessary to support the computer and paper holder.

Still another objective of the present invention is to provide a paper holder which may be easily attached to the computer for supporting a document adjacent the computer screen, or detached from the computer when not in use.

Another objective is to provide such a paper holder having an adapter enabling the paper holder to be utilized on a standard size desk top computer and screen.

A still further objective is to provide such a paper holder which is of simple construction, which achieves the stated objectives in a simple, effective and inexpensive manner, and which solves problems and satisfies needs existing in the art.

These and other objectives and advantages of the improved invention are obtained by the paper holder for securing a paper sheet adjacent a computer screen, the general nature of which may be stated as including a body; a pair of spaced apart legs extending outwardly from said body; at least one flange extending outwardly from said body intermediate said pair of legs; and clip means formed on the body for receiving and securing a sheet of paper on said body.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 5 is a fragmentary end elevational view taken substantially along line 5—5 of FIG. 1, showing the paper holder mounted on a side edge of a portable computer display;

FIG. 6 is an enlarged fragmentary sectional view taken along line 6—6, in FIG. 1;

FIG. 7 is a front perspective view of an adapter enabling the paper holder of FIGS. 1–6 to be used on a larger computer screen;

FIG. 8 is a rear elevational view of the adapter of FIG. 7;

Similar numerals refer to similar parts throughout the drawings.

DESCRIPTION OF THE PREFERRED EMBODIMENT

Figure 1:
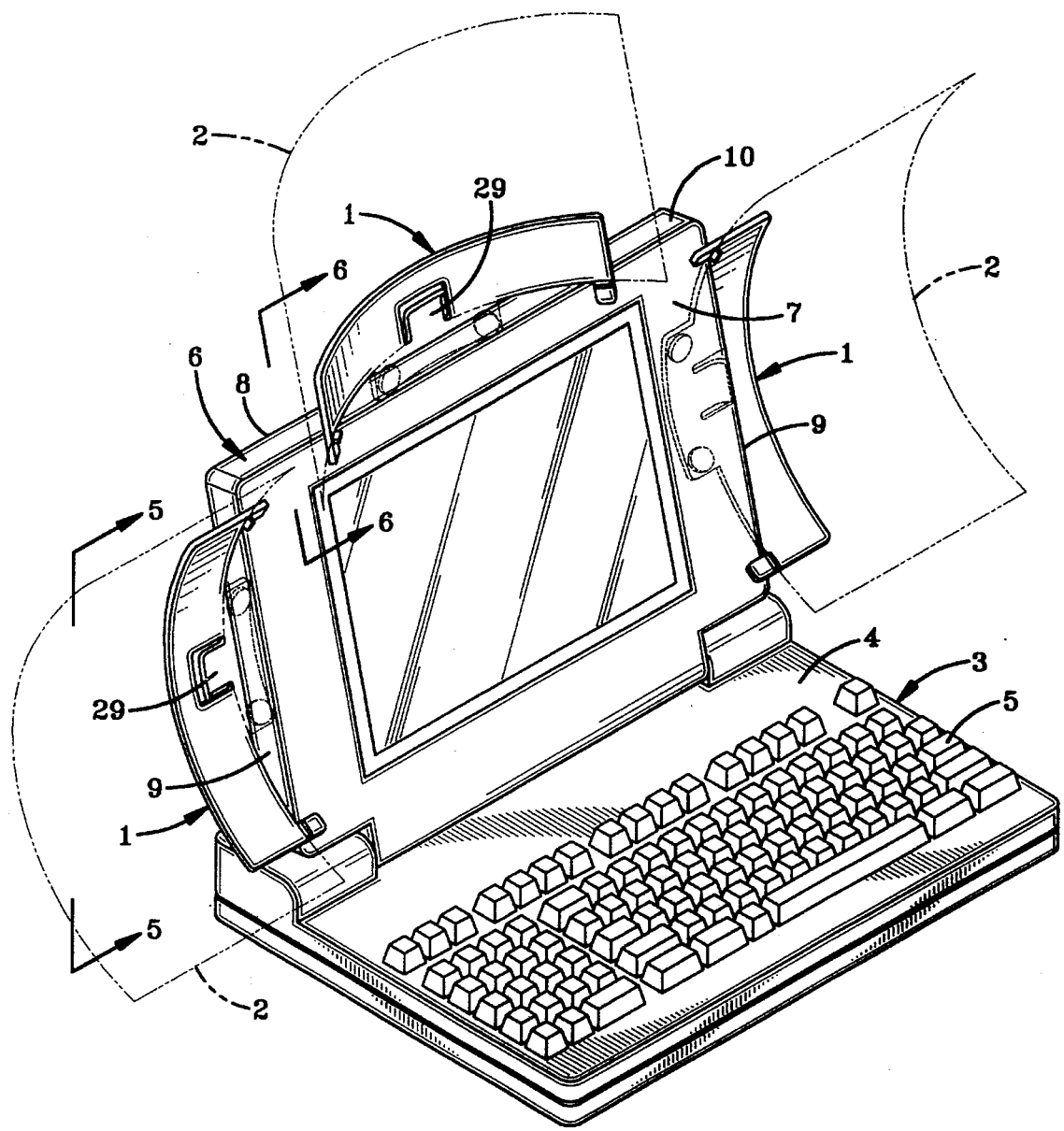
FIG. 1 is a diagrammatic perspective view of a portable computer showing the paper holder mounted at three different possible positions thereon, with a paper sheet held thereby being shown in dot-dash line.

The improved paper holder of the invention is indicated generally at 1, and is adapted to hold a sheet of paper, illustrated in FIG. 1 in dot-dash lines, and indicated at 2. Moreover, paper holder 1 is adapted to be mounted on a portable computer 3. While a variety of mounting positions are available, the preferred embodiment envisions the three alternative mounting positions shown in FIG. 1. Portable computer 3 is of the general clam shell type having a base 4 with a standard keyboard 5 mounted thereon. A display screen 6 is pivotally attached to base 4' and may be moved between a closed position wherein the display screen covers keyboard 5, and an open position as shown in FIG. 1. Display screen 6 includes a front surface 7 and a rear surface 8 which is parallel and spaced apart from front surface 7, and a pair of parallel and spaced apart side edges 9, and a top edge 10 normal thereto.

Figure 2:
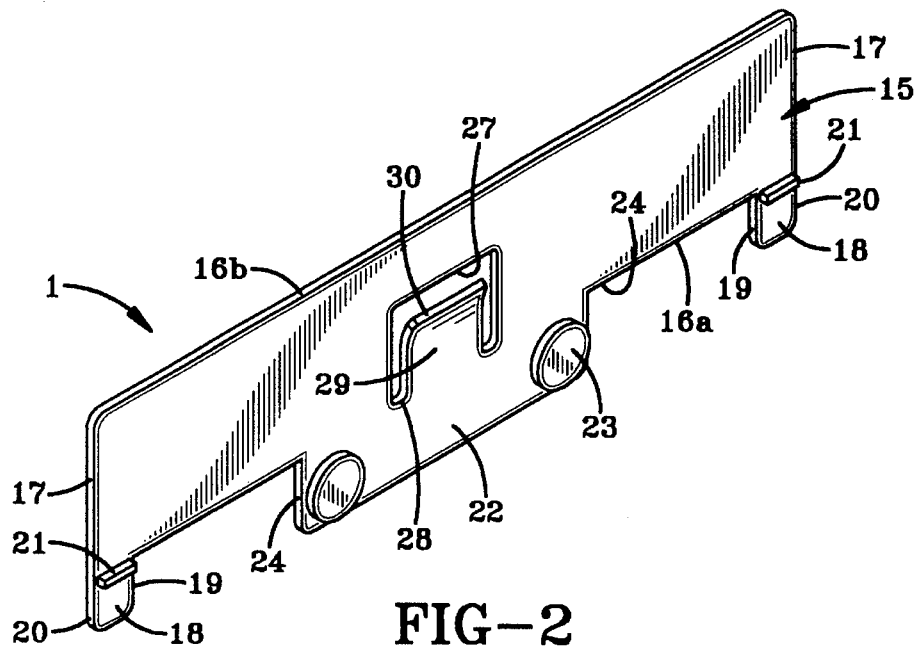
FIG. 2 is a perspective view of the paper holder.
Figure 3:
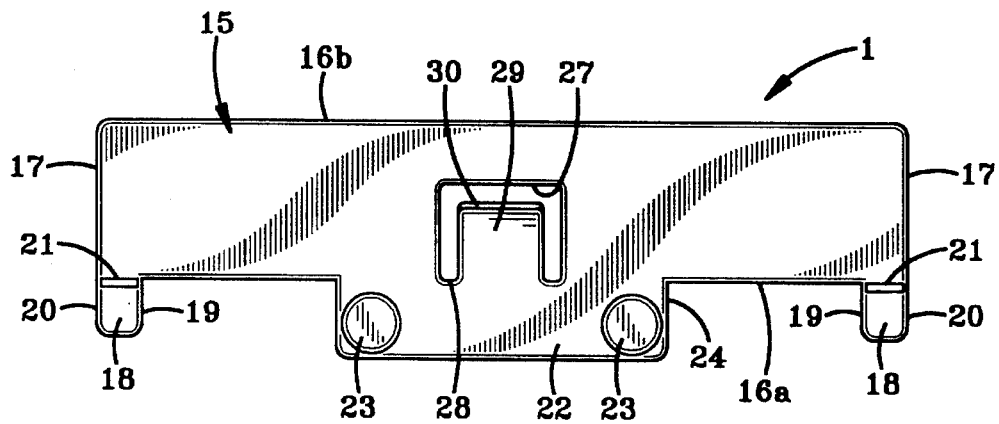
FIG. 3 is a front elevational view thereof.
Figure 4:
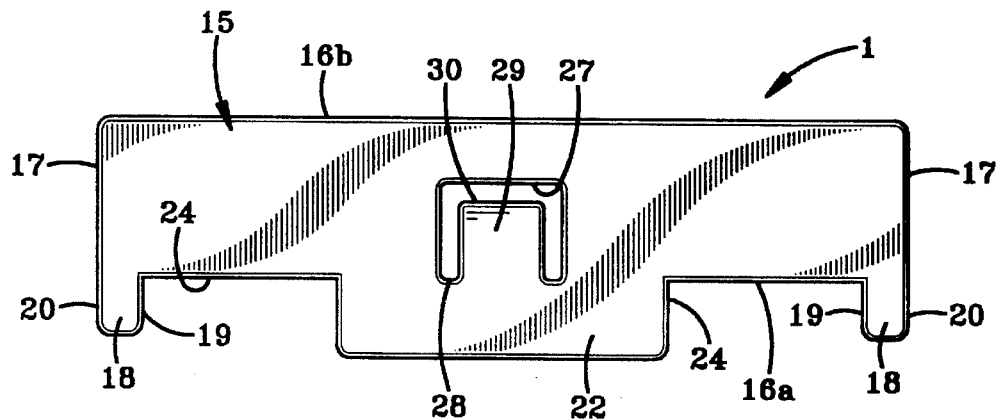
FIG. 4 is a rear elevational view thereof.

Referring specifically to FIGS. 2–4, paper holder 1 includes a body indicated generally at 15, defined by a pair of parallel and spaced apart side edges 16a and 16b collectively, referred to as edges 16, and a pair of parallel and spaced apart end edges 17 normal to side edges 16. In the preferred embodiment, body 15 is elongated such that side edges 16 are longer than end edges 17.

A pair of parallel and spaced apart legs 18 extend outwardly from side edge 16a. Each leg 18 includes an inner edge 19 and an outer edge 20 collinear with a respective end edge 17. An alignment tab 21 is formed on and projects outwardly from each leg 18 adjacent to and collinear with side edge 16a. A central flange 22 extends outwardly from side edge 16a and is positioned intermediate of legs 18. Central flange 22 includes a pair of resilient grip pads 23, the purpose for which will become more apparent hereinbelow. A respective leg 18, central flange 22 and a portion of side edge 16a combine to form one of a pair of three-sided recesses 24 (FIGS. 2 and 6). Alternatively, central flange 22 may be replaced with a pair of flanges each having a grip pad 23 secured thereto without departing from the spirit of the present invention.

A U-shaped opening 27 is formed in body 15 intermediate end edges 17. A projection 29 extends from body 15 and partially into opening 27. Projection 29 is a generally flat member which is coplanar with body 15 and terminates in an outturned free end 30. Sufficient clearance is provided between projection 29 and body 15 to easily pass a sheet of paper 2 therebetween.

In the preferred embodiment, projection 29 is coplanar with body 15 with only outturned portion 30 extending out of the plane of body 15. However, as should be apparent to one of ordinary skill in the art, projection 29 may have a variety of configurations as long as a portion thereof extends into opening 27 to secure or clip a sheet of paper between projection 29 and body 15.

While the present invention may have a variety of configurations without departing from the spirit of the present invention, paper holder 1 preferably is formed as a one-piece member of a flexible plastic material having a thickness of approximately ¹⁄₁₆ of an inch, but at least within the range of ¹⁄₃₂ inch to one quarter inch. The longitudinal length of paper holder 1 defined by side edge 16b preferably is 7 inches when in the relaxed planar configuration shown in FIGS. 2–4. This size has been formed to be most convenient and effective for mounting on a variety of different portable computers. However, the overall length of holder 1 may be in the range of between 5 inches and 10 inches. The height or transverse width of paper holder 1 defined by end edges 17, is within the range of 1 inch and 3 inches, with the preferred height being 1½ inches. Flange 22 preferably has a length of approximately ¾ inch with legs 18 having a length of approximately ½ inch.

As indicated above, paper holder 1 is a one-piece integrally molded plastic member having the substantially planar configuration shown in FIGS. 2–4. However, when the user wishes to mount paper holder 1 on a portable computer 3, it is flexed to a bowed arcuate position as shown in FIGS. 1, 5 and 6 and mounted on top edge 10 or on side edges 9 of screen 6. When arcuately configured, legs 18 are positioned adjacent front surface 7 of screen 6 such that inner edges 19 contact front surface 7, and central flange 22 is positioned adjacent rear surface 8 of display screen 6 such that grip pads 23 engage rear surface 8. Pads 23 preferably are formed of a resilient low durometer rubber and frictionally engage display screen 6 to prevent paper holder 1 from sliding on display screen 6.

When paper holder 1 is installed on computer 3, display screen edges 9 and 10 extends into respective recesses 24 of body 15 (FIG. 6). In the preferred embodiment, paper holder 1 is manufactured of flexible plastic with sufficient memory to bias legs 18 and central flange 22 toward each other, and toward the planar configuration shown in FIG. 2, when installed on display screen 6. This bias will supply sufficient force on surfaces 7 and 8 of display screen 6 to prevent paper holder 1 from sliding with relation thereto.

Once installed on display screen 6, paper sheet 2 is then installed behind projection 29. As projection 29 is at least partially coplanar with body 15, paper sheet 2 will circuitously pass along the front of body 15 and behind projection 29, which will retain paper sheet 2 on paper holder 1. When paper sheet 2 is positioned behind projection 29, it is in abutting engagement with spaced perimeter edges 28 of opening 27 and rests upon alignment tabs 21 to align the paper with respect to paper holder 1. Inasmuch as perimeter edges 28, and alignment tabs 21 are substantially collinear, the paper will remain firmly held within paper holder 1 in a straight orientation for ease of viewing, and accurately aligned with respect to paper holder 1.

In summary, paper holder 1 provides an extremely portable, compact and lightweight device for retaining a paper sheet adjacent a computer screen. Further, paper holder 1 is easily attached and detached from a computer screen for use in a variety of environments including environments where there is substantially no work space available for document reference. Likewise, the flat nature of holder 1 enables it to be conveniently stored and carried by a traveler until it is flexed into its bowed mounting position. Holder 1 can also be molded easily in a variety of colors and can have other configurations than the rectangular shape of the preferred embodiment.

An adapter indicated generally at 35, is shown in FIGS. 7–8 and enables paper holder 1 to be used with a larger computer screen such as used with a usual desk top computer in an office or more permanent type of work area. Adapter 35 is molded as a single one-piece plastic member having a generally rectangular base 36 with a hollow boss 37 extending outwardly from the center thereof. A pair of outwardly extending parallel spaced tabs 38 and 39 are formed adjacent corners 40 and 41, respectively, of base 36. A third tab 43 extends outwardly from one edge of base 36 near the center thereof. The flat surfaces of tabs 38 and 39 are parallel to each other and are perpendicular to the flat surfaces of tab 43.

An attachment disc 45 (FIG. 8) preferably formed of one component of a hook and pile fabric, such as distributed under the trademark VELCRO, is mounted on the recessed rear surface 46 of base 36 by an adhesive or other attachment means. Disc 45 is releasably engaged and mounted on a corresponding disc 47 (FIG. 10) which is mounted on side 48 of a larger computer screen 49 for releasably movably mounting adapter 35 thereon. Disc 47 has the other component of the hook and pile fabric from that of disc 45 so as to releasably engage each other. Attachment discs 45 and 47 enable adapter 35 to be located at various positions on the computer screen usually on the side thereof, and once attachment disc 47 is secured to the computer screen, it will enable adapter 35 to be removably mounted thereon and rotated to various positions extremely easily.

Figure 10:
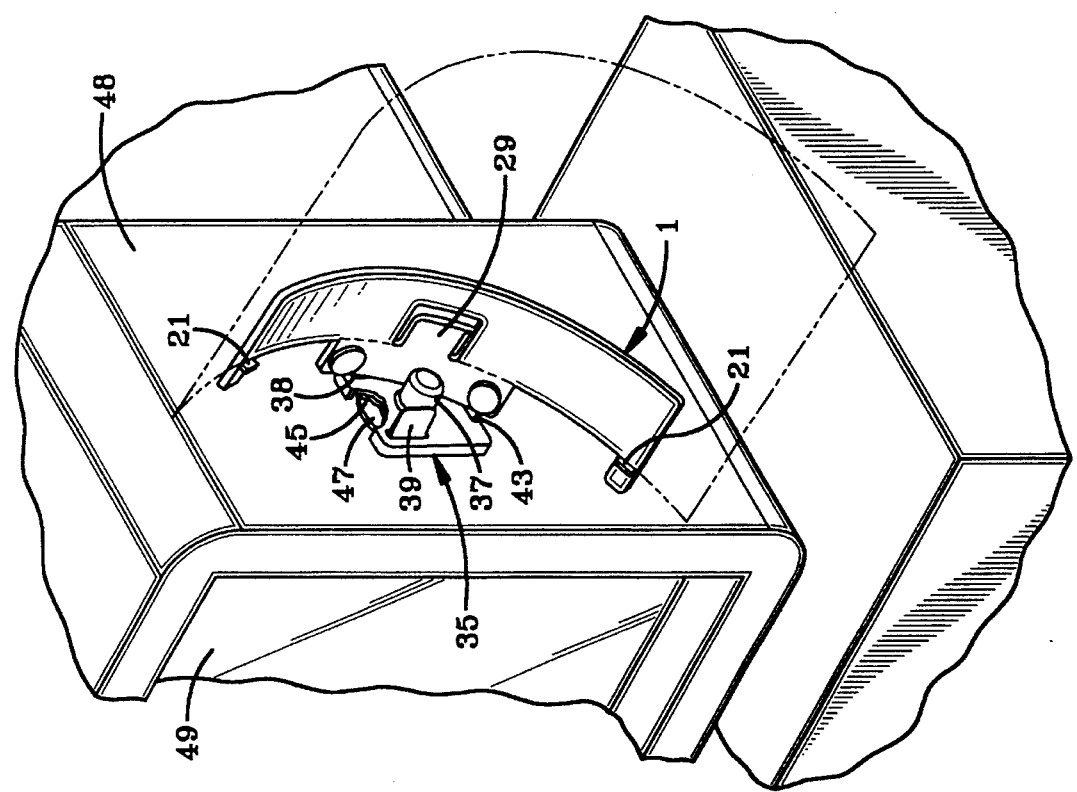
FIG. 10 is a perspective view similar to FIG. 9 with an alternate mounting of the paper holder and adapter on the computer screen.
Figure 9:
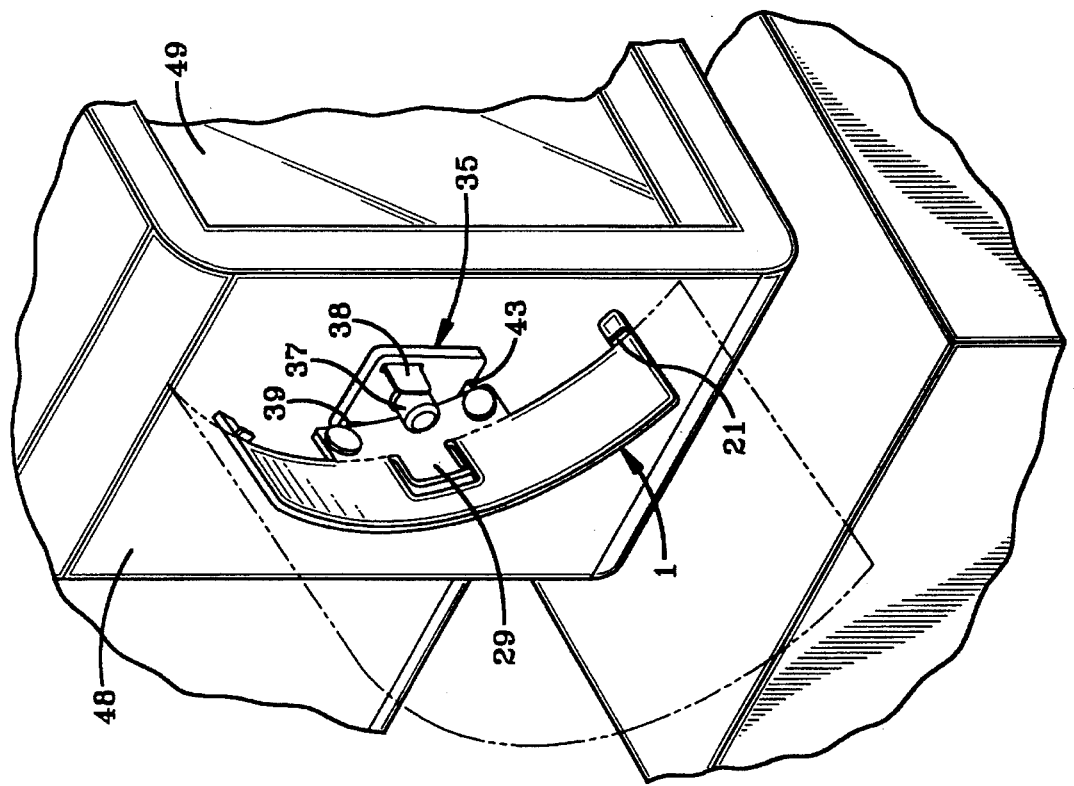
FIG. 9 is a fragmentary perspective view of the adapter of FIGS. 7 and 8 mounted on the side of a computer screen with the paper holder of FIGS. 1–6 mounted thereon.

The mode of operation of adapter 35 in combination with paper holder 1 is shown in FIGS. 9 and 10. As shown in FIG. 9, holder 1 is curved and is inserted between spaced tabs 39 and 43 with the front surface of the lower edge of holder 1 being trapped in back of boss 37. As can be seen in FIG. 9, this enables a sheet of paper shown in dot-dash lines, to be slipped behind projection 29 and rest against alignment tabs 21 as described previously for holding a sheet of paper adjacent the notebook computer screen. FIG. 10 shows an alternate mounting position of paper holder 1 on adapter 35 wherein the paper holder extends around tab 38 and tab 43 and behind post 37.

Adapter 35 can be removed easily from attachment disc 47 and placed in a convenient storage location and is relatively small and lightweight with base 36 being slightly less than 2 inches square, with tabs 38, 39 and 43, and post 37 extending outwardly from base 36 approximately ½ inch.

Adapter 35 thus increases the use of paper holder 1 enabling it to be adaptable for holding a sheet of paper adjacent a larger computer screen than the notebook computer screen for which it is primarily intended, in an extremely simple and effective manner.

Accordingly, the improved paper holder is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved paper holder is constructed and used, the characteristics of the construction, and the advantageous, new and useful results obtained; the new and useful structures, devices, elements, arrangements, parts and combinations, are set forth in the appended claims.

I claim:

1. In combination, a computer and a holder removably mounted on the computer for releasably holding a sheet of paper adjacent said computer; said holder including a flexible flat body bendable between its flat configuration for storage and a bowed configuration for attachment to the computer; first means formed on the body for trapping an edge of the computer therebetween when the body is in the bowed configuration, said first means being a pair of spaced legs and a flange extending along a side of the computer and the flange extending along an opposite side of the computer to bow the body into its bowed configuration and trap said body on said computer, and second means formed on the body for retaining the sheet of paper on said body, when said body is in its bowed configuration on the computer.

2. In combination, a computer and a holder removably mounted on the computer for releasably holding a sheet of paper adjacent said computer; said holder including a flexible flat body bendable between its flat configuration for storage and a bowed configuration for attachment to the computer; first means formed on the flexible body for trapping an edge of the computer therebetween when the body is in the bowed configuration; and second means formed on the body for retaining the sheet of paper on said body, when said body is in its bowed configuration on the computer, said second means being a pair of spaced tabs and a flexible clip located therebetween.

3. In combination, a computer and a holder removably mounted on the computer for releasably holding a sheet of paper adjacent said computer; said holder including a flexible flat body formed of a one-piece flexible plastic member bendable between its flat condition for storage and a bowed condition for attachment to the computer; first means formed on the flexible body for trapping an edge of the computer therebetween when the body is in the bowed condition; and second means formed on the body for retaining the sheet of paper on said body, when said body is in its bowed condition on the computer.

4. The combination defined in claim 3 in which the first means is a pair of spaced legs and a flange located between said legs; and in which said legs extend along a side of the computer and the flange extends along an opposite side of the computer to bow the body into its lowered condition and trap said body on said computer.

5. The combination defined in claim 3 in which the second means is a pair of spaced tabs and a flexible clip located therebetween.

6. The combination defined in claim 3 in which gripper means are on the body to assist in retaining the body on the computer.

* * * * *